US012634791B2

(12) United States Patent
Fujishiro et al.

(10) Patent No.: US 12,634,791 B2
(45) Date of Patent: May 19, 2026

(54) COMMUNICATION CONTROL METHOD AND WIRELESS RELAY APPARATUS

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 362 days.

(21) Appl. No.: 17/735,713

(22) Filed: May 3, 2022

(65) Prior Publication Data

US 2022/0264400 A1 Aug. 18, 2022

Related U.S. Application Data

(63) Continuation of application No. PCT/JP2020/039588, filed on Oct. 21, 2020.

(60) Provisional application No. 62/931,970, filed on Nov. 7, 2019.

(51) Int. Cl.
| | |
|---|---|
| *H04W 36/30* | (2009.01) |
| *H04W 36/12* | (2009.01) |
| *H04W 76/27* | (2018.01) |
| *H04W 48/12* | (2009.01) |
| *H04W 76/19* | (2018.01) |

(52) U.S. Cl.
CPC ......... *H04W 36/305* (2018.08); *H04W 36/12* (2013.01); *H04W 76/27* (2018.02); *H04W 48/12* (2013.01); *H04W 76/19* (2018.02)

(58) Field of Classification Search
CPC ........... H04W 36/00837; H04W 36/12; H04W 36/305; H04W 48/12; H04W 76/19; H04W 88/04; H04W 92/12
See application file for complete search history.

(56) References Cited

U.S. PATENT DOCUMENTS

| | | | |
|---|---|---|---|
| 11,903,070 B2 * | 2/2024 | Ishii ....................... | H04W 24/04 |
| 2013/0077494 A1 * | 3/2013 | Samdanis .............. | H04B 7/155 |
| | | | 370/246 |
| 2020/0092784 A1 * | 3/2020 | Hampel ................ | H04W 76/27 |

(Continued)

FOREIGN PATENT DOCUMENTS

| | | | | |
|---|---|---|---|---|
| WO | WO-2020033965 A1 * | 2/2020 | ......... | H04B 7/15542 |
| WO | WO-2020066943 A1 * | 4/2020 | ........... | H04W 36/08 |

OTHER PUBLICATIONS

Kyocera; "Consideration of topology adaptation upon BH RLF"; 3GPP TSG-RAN WG2 #105; R2-1900919; Feb. 21-Mar. 1, 2019; pp. 1-4, Athens, Greece.

(Continued)

*Primary Examiner* — Mounir Moutaouakil
(74) *Attorney, Agent, or Firm* — Studebaker Brackett PLLC

(57) ABSTRACT

A communication control method using a wireless relay apparatus connected to an upper apparatus via a backhaul link includes, in a case that a backhaul link of the wireless relay apparatus fails to be recovered, by the wireless relay apparatus, executing a first process for re-establishing a backhaul link of a lower wireless relay apparatus connected to the wireless relay apparatus by using a first message of a BAP layer of the wireless relay apparatus; and executing a second process for re-establishing or releasing an access link of a user equipment connected to the wireless relay apparatus by using a second message of a layer different from the BAP layer.

5 Claims, 14 Drawing Sheets

(56) References Cited

U.S. PATENT DOCUMENTS

| | | | | |
|---|---|---|---|---|
| 2021/0360496 A1* | 11/2021 | Ishii | ............... | H04W 36/00837 |
| 2022/0015176 A1* | 1/2022 | Ishii | .................... | H04W 76/15 |

OTHER PUBLICATIONS

Samsung; 3rd Generation Partnership Project; Technical Specification Group Services and System Aspects; Study on Security for NR Integrated Access and Backhaul; 3GPP TR 33.824 vo. 4.0, Aug. 2019, pp. 1-3, Release 16; 3GPP Organizational Partners.

Kyocera, "Consideration of RLF recovery in IAB"; 3GPP TSG-RAN WG2 #104; R2-1817573, Nov. 12-16, 2018, pp. 1-3, Spokane, USA.

LG Electronic, "Framework of Bh Rlf notification and recovery"; 3GPP TSG-RAN WG2 Meeting #105 bis; R2-1905028, Apr. 8-12, 2019, pp. 1-6, Xian, China.

Kyocera, "Further consideration of topology adaptation upon BH RLF", 3GPP TSG-RAN WG2 #105-bis, R2-1903730, Apr. 8-12, 2019, Xi'an, China, 7 pages.

LG Electronics, "Resolving open issues on BH RLF", 3GPP TSG-RAN WG2 Meeting #107bis, R2-1913803, Aug. 14-18, 2019, Chongqing, China, 7 pages.

Nokia, Nokia Shanghai Bell, "BH link failure handling", 3GPP TSG-RAN WG2 Meeting #107bis, R2-1913460, Oct. 14-18, 2019, Chongqing, China, 6 pages.

* cited by examiner

COMMUNICATION CONTROL METHOD AND WIRELESS RELAY APPARATUS

RELATED APPLICATIONS

The present application is a continuation based on PCT Application No. PCT/JP2020/039588, filed on Oct. 21, 2020, which claims the benefit of U.S. Provisional Application No. 62/931,970 filed on Nov. 7, 2019. The content of which is incorporated by reference herein in their entirety.

TECHNICAL FIELD

The present disclosure relates to a communication control method and a wireless relay apparatus that are used in a mobile communication system.

BACKGROUND ART

In the 3rd Generation Partnership Project (3GPP), which is a standardization project of a mobile communication system, a new wireless relay apparatus referred to as an Integrated Access and Backhaul (IAB) node has been under study. One or a plurality of wireless relay apparatuses are involved in communication between a donor base station and a user equipment, and perform relay for the communication.

Such a wireless relay apparatus includes a user equipment function processor and a base station function processor, and performs wireless communication with an upper apparatus (the base station or an upper wireless relay apparatus) by using the user equipment function processor and performs wireless communication with a lower apparatus (the user equipment or a lower wireless relay apparatus) by using the base station function processor.

SUMMARY

A communication control method according to a first aspect is a method using a wireless relay apparatus connected to an upper apparatus via a backhaul link. The communication control method includes, in a case that a backhaul link of the wireless relay apparatus fails to be recovered, by the wireless relay apparatus, executing a first process for re-establishing a backhaul link of a lower wireless relay apparatus connected to the wireless relay apparatus by using a first message of a BAP layer of the wireless relay apparatus; and executing a second process for re-establishing or releasing an access link of a user equipment connected to the wireless relay apparatus by using a second message of a layer different from the BAP layer.

A wireless relay apparatus according to a second aspect is an apparatus for connecting to an upper apparatus via a backhaul link. The wireless relay apparatus includes a controller configured to execute, in a case that a backhaul link of the wireless relay apparatus fails to be recovered, a first process for re-establishing a backhaul link of a lower wireless relay apparatus connected to the wireless relay apparatus by using a first message of a BAP layer of the wireless relay apparatus, and a second process for re-establishing or releasing an access link of a user equipment connected to the wireless relay apparatus by using a second message of a layer different from the BAP layer.

DESCRIPTION OF EMBODIMENTS

A mobile communication system according to an embodiment will be described with reference to the drawings. In the description of the drawings, the same or similar parts are denoted by the same or similar reference signs.

Configuration of Mobile Communication System

Figure 1:
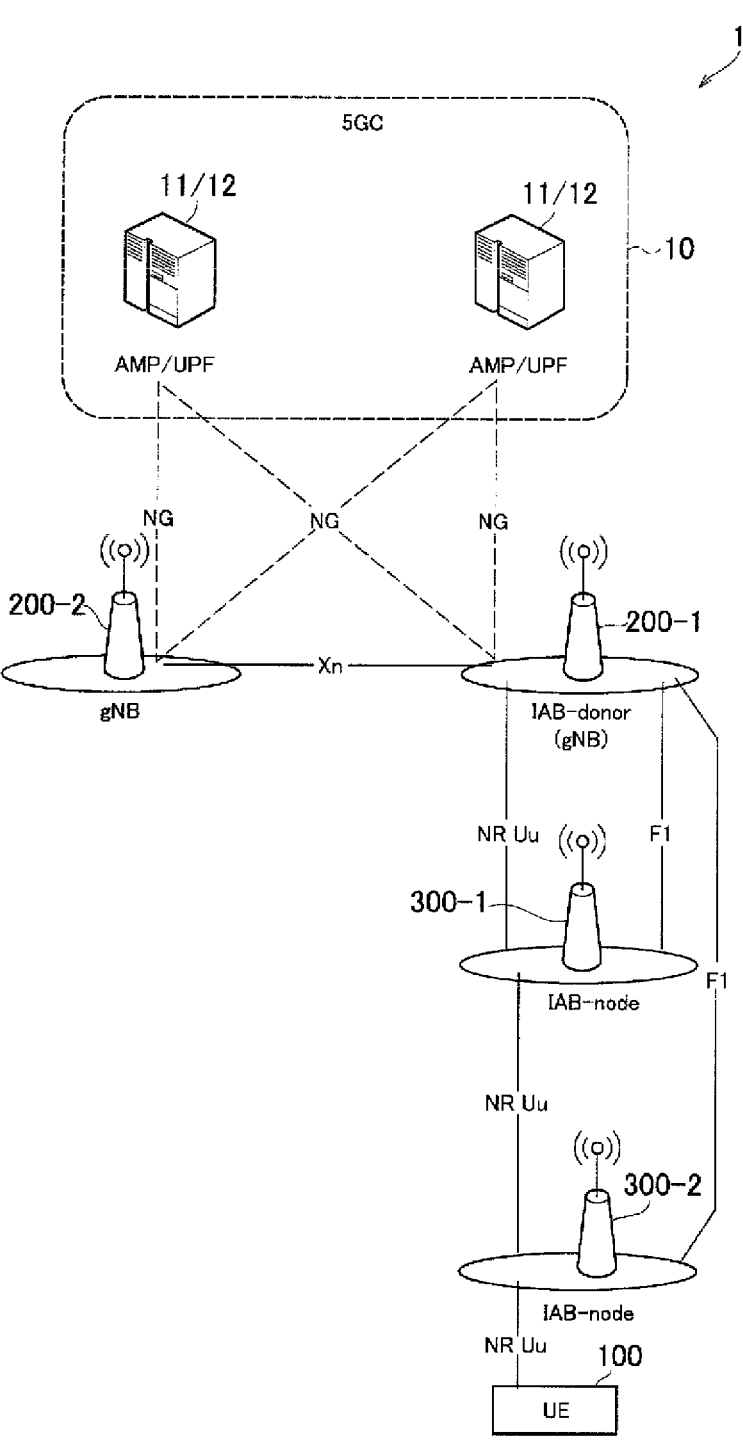
FIG. 1 is a diagram illustrating a configuration of a mobile communication system according to an embodiment.

First, a configuration of a mobile communication system according to an embodiment will be described. FIG. 1 is a diagram illustrating a configuration of the mobile communication system 1 according to an embodiment.

The mobile communication system 1 is a fifth generation (5G) mobile communication system based on the 3GPP standard. Specifically, a radio access scheme in the mobile communication system 1 is New Radio (NR) being a radio access scheme of 5G. Note that Long Term Evolution (LTE) may be at least partially applied to the mobile communication system 1.

As illustrated in FIG. 1, the mobile communication system 1 includes a 5G core network (5GC) 10, a user equipment (UE) 100, a base station (referred to as a gNB) 200, and an IAB node 300. The IAB node 300 is an example of a wireless relay apparatus. An embodiment mainly describes an example in which the base station is an NR base station. However, the base station may be an LTE base station (specifically, an eNB).

The 5GC 10 includes an Access and Mobility Management Function (AMF) 11 and a User Plane Function (UPF) 12. The AMF 11 is an apparatus that performs various types of mobility control and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

Each gNB 200 is a fixed wireless communication apparatus that manages one or a plurality of cells. The cell is used as a term denoting a minimum unit of a wireless communication area. The cell may be used as a term denoting a function or a resource for performing wireless communication with the UE 100. One cell belongs to one carrier frequency.

Each gNB 200 is interconnected with the 5GC 10 via an interface referred to as an NG interface. FIG. 1 illustrates an example of two gNBs, a gNB 200-1 and a gNB 200-2 that are connected to the 5GC 10.

Each gNB 200 is connected to another gNB 200 in an adjacency relationship via an inter-base station interface referred to as an Xn interface. FIG. 1 illustrates an example in which the gNB 200-1 is connected to the gNB 200-2.

Each gNB 200 may be divided into a central unit (CU) and a distributed unit (DU). The CU and the DU are connected to each other via an interface referred to as an F1 interface. The F1 protocol is a communication protocol between the CU and the DU, and includes an F1-C protocol corresponding to a protocol for a control plane and an F1-U protocol corresponding to a protocol for a user plane.

The mobile communication system 1 supports an IAB that uses NR for the backhaul to enable wireless relay of NR access. The donor gNB 200-1 is a gNB 200 corresponding to a terminal node of the NR backhaul on the network side and including additional functions that support the IAB. The backhaul is capable of multi-hop through a plurality of hops.

Each IAB node 300 includes a user equipment function processor (MT) and a base station function processor (DU).

The MT is connected to the DU of an upper apparatus (upper IAB node or a donor gNB 200-1). The MT is connected to the CU of the donor gNB 200-1 by using Radio Resource Control (RRC), and establishes, with the donor gNB 200-1, a signaling radio bearer (SRB) that carries an RRC message and an NAS message. An adjacent node on an NR Uu wireless interface of the MT (i.e., an upper apparatus) may be referred to as a "master node." A radio link between the MT of the IAB node 300 and the upper apparatus is referred to as a backhaul link.

The DU manages cells similarly to the gNB 200. The DU terminates the NR Uu wireless interface to the UE 100 and a lower IAB node. The DU supports the F1 protocol for the CU of the donor gNB 200-1. An adjacent node on an NR access interface of the DU (i.e., lower apparatus) may be referred to as a "slave node".

All IAB nodes 300 connected to the donor gNB 200-1 via one or a plurality of hops form a Directed Acyclic Graph (DAG) topology rooted in the donor gNB 200-1. The DAG topology may be referred to as an IAB topology. In the DAG topology, "upstream" refers to the direction of the master node, "downstream" refers to the direction of the slave node.

An example is illustrated in FIG. 1 in which the IAB node 300-1 is wirelessly connected to the donor gNB 200-1, the IAB node 300-2 is wirelessly connected to the IAB node 300-1, and the F1 protocol is transmitted via two backhaul hops.

The UE 100 is a mobile wireless communication apparatus that can perform wireless communication with cells. The UE 100 may be any type of apparatus as long as the UE 100 is an apparatus that performs wireless communication with the gNB 200 or the IAB node 300. For example, the UE 100 is a mobile phone terminal, a tablet terminal, a laptop PC, a sensor, an apparatus that is provided at a sensor, a vehicle, and/or an apparatus that is provided at a vehicle. The UE 100 is wirelessly connected to an upper apparatus (IAB node 300 or gNB 200) via an access link.

FIG. 1 illustrates an example in which the UE 100 is wirelessly connected to the IAB node 300-2. The UE 100 indirectly communicates with the donor gNB 200-1 via the IAB node 300-1 and the IAB node 300-2. Specifically, the IAB node 300-2 and the IAB node 300-1 relay upstream data from the UE 100 to the donor gNB 200-1 and relay downstream data from the gNB 200-1 to the UE 100.

Configuration of Base Station

Figure 2:
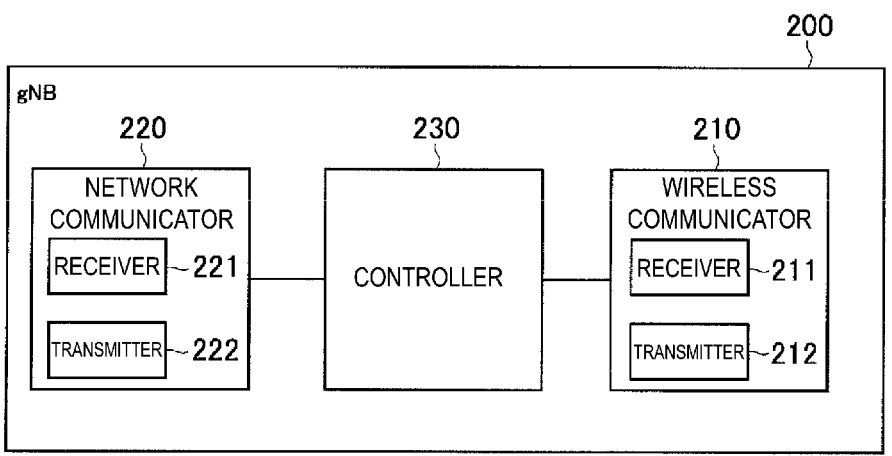
FIG. 2 is a diagram illustrating a configuration of a gNB used as a base station (gNB) according to the embodiment.

Now, a configuration of the gNB 200, corresponding to a base station according to an embodiment, will be described. FIG. 2 is a diagram illustrating a configuration of the gNB 200. As illustrated in FIG. 2, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception while being controlled by the controller 230. The receiver 211 includes an antenna, and converts a radio signal received by the antenna into a baseband signal (received signal) and outputs the baseband signal to the controller 230. The transmitter 212 performs various types of transmission while being controlled by the controller 230. The transmitter 212 includes an antenna, and converts a baseband signal (transmission signal) to be output by the controller 230 into a radio signal and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception while being controlled by the controller 230. The receiver 221 receives a signal from the outside and outputs the received signal to the controller 230. The transmitter 222 performs various types of transmission while being controlled by the controller 230. The transmitter 222 transmits a transmission signal output by the controller 230 to the outside.

The controller 230 performs various types of control for the gNB 200. The controller 230 includes at least one memory and at least one processor electrically connected to the memory. The memory stores programs to be executed by the processor and information to be used for processes by the processor. The processor may include a baseband processor and a Central Processing Unit (CPU). The baseband processor performs modulation and demodulation, and coding and decoding of a baseband signal, and the like. The CPU executes the programs stored in the memory to perform various types of processes. The processor executes processing of the layers described below.

Configuration of Wireless Relay Apparatus

Figure 3:
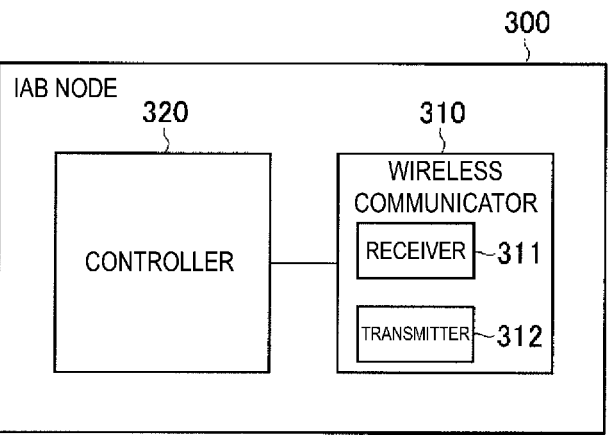
FIG. 3 is a diagram illustrating a configuration of an IAB node used as a wireless relay apparatus according to the embodiment.

Now, a configuration of the IAB node 300, corresponding to a wireless relay apparatus according to an embodiment, will be described. FIG. 3 is a diagram illustrating a configuration of the IAB node 300. As illustrated in FIG. 3, the IAB node 300 includes a wireless communicator 310 and a controller 320. The IAB node 300 may include a plurality of wireless communicators 310.

The wireless communicator 310 performs wireless communication (backhaul link) with the gNB 200 and performs wireless communication (access link) with the UE 100. The wireless communicator 310 for the backhaul link communication and the wireless communicator 310 for the access link communication may be provided separately.

The wireless communicator 310 includes a receiver 311 and a transmitter 312. The receiver 311 performs various types of reception while being controlled by the controller 320. The receiver 311 includes an antenna, and converts a radio signal received by the antenna into a baseband signal (received signal) and outputs the baseband signal to the controller 320. The transmitter 312 performs various types of transmission while being controlled by the controller 320. The transmitter 312 includes an antenna, and converts a baseband signal (transmission signal) to be output by the controller 320 into a radio signal and transmits the radio signal from the antenna.

The controller 320 performs various types of control in the IAB node 300. The controller 320 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor executes processing of the layers described below.

Configuration of User Equipment

Figure 4:
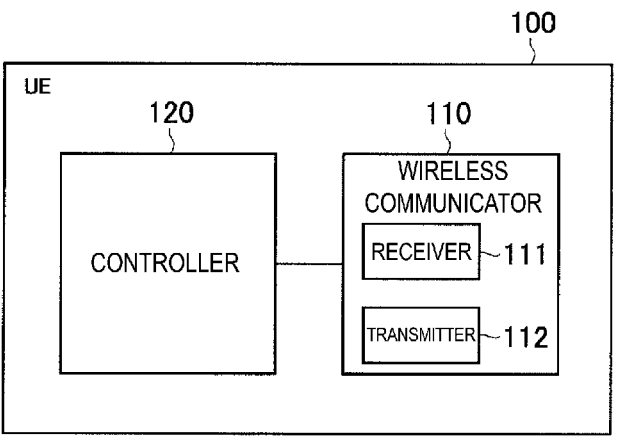
FIG. 4 is a diagram illustrating a configuration of a UE corresponding to a user equipment according to an embodiment.

Now, a configuration of the UE 100, corresponding to a user equipment according to an embodiment, will be described. FIG. 4 is a diagram illustrating a configuration of the UE 100. As illustrated in FIG. 4, the UE 100 includes a wireless communicator 110 and a controller 120.

The wireless communicator 110 is used for wireless communication in the access link, specifically, wireless communication with the gNB 200 and wireless communication with the IAB node 300. The wireless communicator 110 includes a receiver 111 and a transmitter 112. The receiver 111 performs various types of reception while being controlled by the controller 120. The receiver 111 includes an antenna, and converts a radio signal received by the antenna into a baseband signal (received signal) and outputs the baseband signal to the controller 120. The transmitter 112 performs various types of transmission while being controlled by the controller 120. The transmitter 112 includes an antenna, and converts a baseband signal (transmission signal) to be output by the controller 120 into a radio signal and transmits the radio signal from the antenna.

The controller 120 performs various types of control in the UE 100. The controller 120 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor executes processing of the layers described below.

Example of Protocol Stack Configuration

Figure 5:
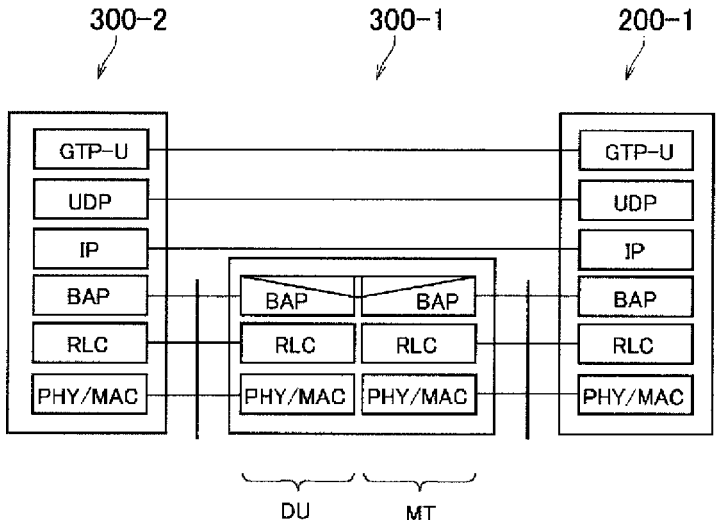
FIG. 5 is a diagram illustrating an example of a protocol stack for an F1-U protocol according to an embodiment.

Now, an example of a protocol stack configuration in the mobile communication system 1 according to an embodiment will be described. FIG. 5 is a diagram illustrating an example of a protocol stack for the F1-U protocol.

As illustrated in FIG. 5, the donor gNB 200-1 includes layers of the GPRS Tunneling Protocol for User Plane (GTP-U), the User Datagram Protocol (UDP), the Internet Protocol (IP), the Backhaul Adaptation Protocol (BAP), the Radio Link Control (RLC), the Medium Access Control (MAC), and the Physical Layer (PHY).

The IAB node 300-2 on the downstream communicates with the donor gNB 200-1 via the IAB node 300-1, used as an intermediate node. Similar to the donor gNB 200-1, the IAB node 300-2 includes the layers of the GTP-U, the UDP, the IP, the BAP, the RLC, the MAC, and the PHY.

The IAB node 300-1, used as an intermediate node, includes the functions sections MT and DU. The MT includes the layers of the BAP, RLC, MAC, and PHY. The DU includes the layers of the BAP, RLC, MAC, and PHY. FIG. 5 illustrates an example in which the BAP layer of the DU and the BAP layer of the MT are separately provided. However, the BAP layer of the DU and the BAP layer of the MT may be integrated.

The protocol related to the wireless interface will now be described. The PHY layer performs coding and decoding, modulation and demodulation, mapping and demapping of antennas, and mapping and demapping of resources. Data and control information are transmitted between the PHY layers via a physical channel.

The MAC layer performs priority control of data, retransmission process through a hybrid ARQ (HARQ), and the like. Data and control information are transmitted between the MAC layers via a transport channel. The MAC layer of the donor gNB 200-1 and the MAC layer of the DU include a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layers via a logical channel.

The BAP layer executes, in the user plane, routing processing and bearer mapping and demapping processing.

Figure 6:
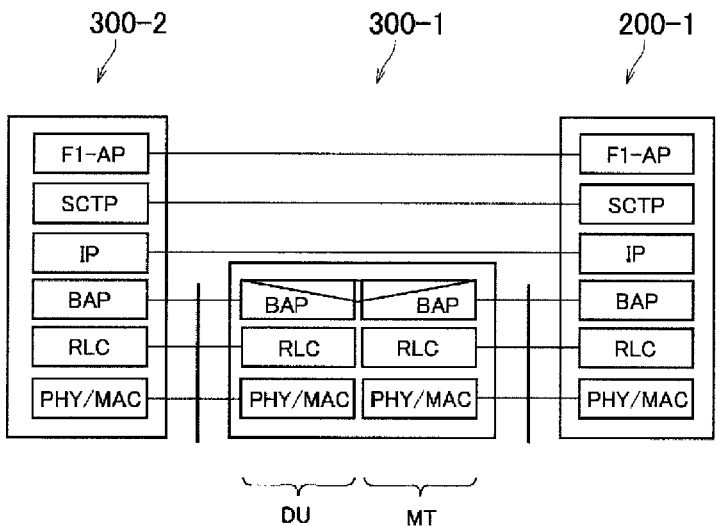
FIG. 6 is a diagram illustrating an example of a protocol stack for an F1-C protocol according to an embodiment.

FIG. 6 is a diagram illustrating an example of a protocol stack for the F1-C protocol. Now, differences from F1-U protocol will be described.

As illustrated in FIG. 6, the donor gNB 200-1 includes layers of the F1-Application Protocol (F1-AP) and the Stream Control Transaction Protocol (SCTP) instead of the layers of the GTP-U and the UDP illustrated in FIG. 6. Similarly, the IAB node 300-2 on the downstream includes the layers of the F1-AP and SCTP instead of the layers of the GTP-U and UDP illustrated in FIG. 5.

Operations of Mobile Communication System

Figure 7:
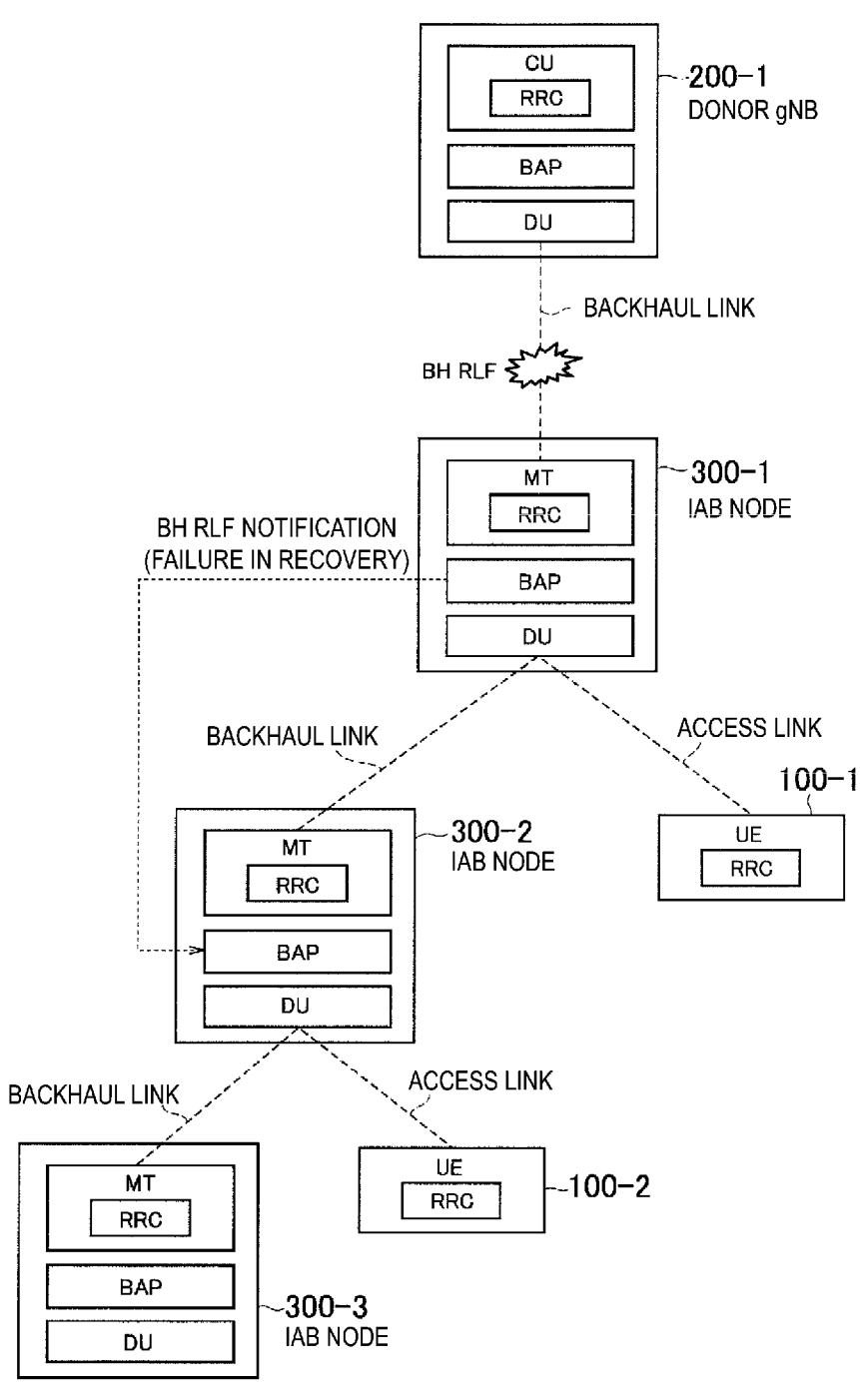
FIG. 7 is a diagram illustrating operations in a mobile communication system 1 according to an embodiment.

Operations in the mobile communication system 1 according to an embodiment will be described. FIG. 7 is a diagram illustrating operations in the mobile communication system 1 according to an embodiment.

As illustrated in FIG. 7, the donor gNB 200-1 includes a CU, an entity of the BAP layer (hereinafter referred to as the "BAP Entity," and a DU. Each of IAB nodes 300-1 to 300-3 includes an MT, a BAP entity, and a DU.

Each of the CU, MT, and UE 100 includes an entity of the RRC layer (hereinafter referred to as the "RRC Entity"). Each of the RRC entity of the MT and the RRC entity of the UE 100 transmits and receives a message from the RRC layer (hereinafter referred to as the "RRC Message") to and from the RRC entity of the CU. The CU manages and controls the IAB topology by using the RRC message. The CU may manage and control the IAB topology by using a message for the F1 protocol for transmitting to and/or receiving from the DU (hereinafter referred to as the "F1 Message").

An example is illustrated in FIG. 7 in which the MT of the IAB node 300-1 is connected wirelessly to the DU of the donor gNB 200-1 via a backhaul link, and the MT of the IAB node 300-2 is connected wirelessly to the DU of the IAB node 300-1 via a backhaul link, and the MT of the IAB node 300-3 is connected wirelessly to the DU of the IAB node 300-2 via a backhaul link.

FIG. 7 illustrates an example in which the UE 100-1 is connected wirelessly to the DU of IAB node 300-1 via an access link, and the UE 100-2 is connected wirelessly to the DU of IAB node 300-2 via an access link.

FIG. 7 illustrates an example in which the IAB node 300 is connected to one upper apparatus via the backhaul link. However, the IAB node 300 may have dual connectivity to two upper apparatuses.

In this regard, one of the two upper apparatuses is a master node (MN), and the other is a secondary node (SN). The backhaul link between the IAB node 300 and the MN may be referred to as a Master Cell Group (MCG) link, and the backhaul link between the IAB node 300 and the SN may be referred to as a Secondary Cell Group (SCG) link.

An embodiment assumes that a failure (Radio Link Failure (RLF)) occurs in the backhaul link. Such an RLF is referred to as a BH RLF. The MT detects a BH RLF, for example, as described below, and executes process to recover from the BH RLF.

First, in a case of detecting an out-of-synchronization state (out-of-sync) N310 consecutive times, the MT detects a radio problem and starts a timer T310. After starting the timer T310, the MT stops the timer T310 in a case of detecting an in-synchronization state (in-sync) N311 consecutive times.

Second, in a case of expiry of the timer T310 without stopping the timer T310, the MT detects an RLF and starts a timer T311 (i.e., initiates RRC re-establishment process), and executes cell selection process to re-establish the backhaul link. In a case of selecting an appropriate cell by cell selection process and re-establishing the backhaul link for the cell selected, the MT stops the timer T311. The appropriate cell refers to a cell that meets at least a minimum radio quality criterion.

Third, in a case of expiry of the timer T311 with unsuccessful re-establishment of the backhaul link, the MT transitions to an RRC idle state. A failure in recovery from a BH RLF (i.e., the timer T311 expires) following the detection of the BH RLF is hereinafter referred to as a failure in backhaul link re-establishment (recovery).

Note that when the IAB node 300 has dual connectivity, the MT separately detects BH RLFs in the MCG link and the SCG link. The failure in backhaul link re-establishment also includes a case that the MT detects a BH RLF in both the MCG link and the SCG link and fails to recover from the BH RLF in both or one of the MCG link and the SCG link.

In a case that the MT of the IAB node 300 fails to re-establish the backhaul link, the BAP entity of IAB node 300 transmits a failure notification message to the BAP entity of the lower IAB node 300. The failure notification message is a message from the BAP layer. Such a failure notification message is hereinafter referred to as the "BH RLF notification message". The failure notification message may also be referred to as a "recovery failure message".

The BAP entity of the lower IAB node 300, in a case of receiving a BH RLF notification message from the BAP entity of the IAB node 300 used as the upper node of the lower IAB node 300 itself, notifies the MT of the lower IAB node 300 itself of the reception, and the MT initiates process for recovering the backhaul link, for example, RRC re-establishment process. In a case of initiating the RRC re-establishment process, the MT starts the timer T311 and executes cell selection process to re-establish the backhaul link.

FIG. 7 assumes that the MT of the IAB node 300-1 detects a BH RLF with the donor gNB 200-1, used as the upper apparatus, and fails to re-establish the backhaul link. In an example described below, the upper apparatus of the IAB node 300-1 is the donor gNB 200-1. However, the upper apparatus of the IAB node 300-1 may be the upper IAB node 300.

In this case, the BAP entity of IAB node 300-1 transmits the BH RLF notification message to the BAP entity of IAB node 300-2. However, the DU of the IAB node 300-1 maintains the cell without interruption. For example, the DU of the IAB node 300-1 continues to transmit a Synchronization Signal and PBCH block (SSB), corresponding to a downlink signal used for detecting and measuring the cell.

Thus, in a case that the MT of the IAB node 300-2 executes the cell selection process in the process for re-establishing the backhaul link (RRC re-establishment process) in response to the BH RLF notification message, the MT of the IAB node 300-2 may detect, as an appropriate cell, the cell of the IAB node 300-2 not having recovered from the BH RLF.

As a result, a problem is that the IAB node 300-2 fails to re-establish the RRC connection to the donor gNB 200-1 and thus fails to provide the relay function based on IAB (hereinafter referred to as "Problem 1"). In particular, in a case that the IAB node 300-2 is located physically close to the IAB node 300-1 (wireless condition is good), such a problem is prominent. Furthermore, since a BH RLF occurs, the MT of the IAB node 300-2 fails to transmit and receive the RRC message or the F1 message to and from the CU of the donor gNB 200-1. Thus, after a BH RLF occurs, it is difficult to solve Problem 1 under the control of the CU.

The BH RLF notification message is a message from the BAP layer, but the UE 100 includes no BAP layer (BAP entity). Thus, the UE 100-1 connected to the IAB node 300-1 fails to receive the BH RLF notification message from the IAB node 300-1. Furthermore, since the cell of the IAB node 300-1 is maintained without interruption, the UE 100-1 also fails to detect the RLF by itself and fails to switch the access link to another cell. In addition, since the RRC entity of the UE 100-1 fails to transmit and receive the RRC message and/or the F1 message to and from the CU of the donor gNB 200-1, it is difficult to transfer the UE 100-1 to another cell under the control of the CU after the BH RLF occurs. Thus, a problem is that the UE 100-1 fails to re-establish the RRC connection, thus preventing data transmission and/or reception to and/or from the network (hereinafter referred to as "Problem 2").

(1) Operation for Solving Problem 1

Next, operations for solving Problem 1 described above will be described. As illustrated in FIG. 7, a communication control method according to an embodiment is a method executed in the IAB node 300-2 connected via a backhaul link to the IAB node 300-1, used as an upper apparatus.

First, the receiver 311 (the BAP entity) of the IAB node 300-2 receives, from the IAB node 300-1, the BH RLF notification message indicating that a failure has occurred in the backhaul link of the IAB node 300-1 and that the IAB node 300-1 has failed to recover the backhaul link. As described above, the BH RLF notification message is a message from the BAP layer.

Second, the controller 320 (MT) of the IAB node 300-2 switches the backhaul link of the IAB node 300-2 from the IAB node 300-1 to another upper apparatus in response to receiving of the BH RLF notification message from the IAB node 300-1 regardless of the radio state (radio quality) of the backhaul link of the IAB node 300-2. In this regard, "regardless of the radio state of backhaul link" may indicate "regardless of whether the radio state of the backhaul link satisfies the predetermined radio quality criterion."

In other words, the controller 320 (MT) of the IAB node 300-2 forcibly switches the backhaul link of the IAB node 300-2 to the other IAB node 300-1 in a case of receiving the BH RLF notification message from the IAB node 300-1 even in a case that the radio state of the backhaul link of the IAB node 300-2 satisfies the predetermined radio quality criterion. In this way, the IAB node 300-2 can perform switch to another cell to re-establish the backhaul link without selecting the cell of the IAB node 300-2 not having recovered from the BH RLF as an appropriate cell.

(1.1) Operation Example 1

Now, Operation Example 1 for solving Problem 1 described above will be described. In Operation Example 1, the MT of the IAB node 300-2 that receives the BH RLF notification message from the IAB node 300-1, performs the RRC re-establishment process to switch the backhaul link of the IAB node 300-2. In this regard, in the RRC re-establishment process, the MT of the IAB node 300-2 performs exclusion process for excluding (the cell of) the IAB node 300-1 having transmitted the BH RLF notification message from the targets for which the backhaul link of the IAB node 300-2 is to be re-established.

Operation Example 1 assumes that the IAB node 300-2 does not have dual connectivity. However, it may be assumed that the IAB node 300-2 has dual connectivity. In a case that the IAB node 300-2 has dual connectivity and that the IAB node 300-2 receives the BH RLF notification message for both the MCG link and the SCG link, Operation Example 1 may be applied.

The exclusion process may be any process for excluding the cell of the IAB node 300-1 having transmitted the BH RLF notification message, but may be, for example, process for excluding, from the selection targets, the cell of the IAB node 300-1 or the frequency to which the cell belongs. In general cell selection process, search is performed with previously connected cells or the frequencies to which the cells belong being preferentially set as candidates for the appropriate cell, based on the cell information and frequency information of the previously connected cells. The MT of the IAB node 300-2 may perform the search with the cell of the IAB node 300-1 or the frequency to which the cell belongs being executed from the stored cell information and frequency information.

The exclusion process may be process for reducing, to the lowest priority, the priority of the cell of the IAB node 300-1 or the priority of the frequency to which the cell belongs. For example, the MT of the IAB node 300-2 may be processed to reduce the measurement result of the cell of the IAB node 300-1 or the frequency to which the cell belongs (e.g., down to zero or a negative value), or may be configured with a radio quality criterion higher than the normal radio quality criterion, the radio quality criterion being imposed on the cell of the IAB node 300-1 or the frequency to which the cell belongs (e.g., the radio quality criterion may be configured to infinity).

In a case that the information of the cells or frequencies to be excluded is notified to the IAB node 300-2 from the upper apparatus (IAB node 300-1), the MT of the IAB node 300-2 may perform the exclusion process based on the information. For example, the MT of the IAB node 300-2 excludes the notified cells or cells belonging to the notified frequencies from the selection targets as described above. The information of the cells or frequencies to be excluded may be included in the BH RLF notification message from the IAB node 300-1 or may be broadcast in system information from the IAB node 300-1. For example, in a case that the DU of the IAB node 300-1 operates a plurality of cells by using a plurality of frequencies, a BH RLF occurring in the backhaul of the IAB node 300-1 makes all of the plurality of cells be unavailable. In such a case, the IAB node 300-2 is notified of the information of all the frequencies or all of the cells operated by the DU of the IAB node 300-1 to allow prevention of the MT of the IAB node 300-2 from selecting an unavailable cell.

In Operation Example 1, the MT of the IAB node 300-2 may continue the exclusion process for a certain period of time from the initiation of the RRC re-establishment process. The certain period of time when the exclusion process is continued may be a period configured for the timer T311 described above, and may have a fixed value or a variable value. Alternatively, the certain period of time for which the exclusion process is continued may be a period of time configured for a timer different from the timer T311. For example, the certain period of time for which the exclusion process is continued may be longer or shorter than the period of time configured for the timer T311. In a case that the certain period of time for which the exclusion process is continued is longer than the period of time configured for the timer T311, the exclusion process can be continued within the certain period of time even in a case that cell re-selection process is executed after expiry of the timer T311. The certain period of time for which the exclusion process is continued may be configured for the MT of the IAB node 300-2 by the CU of the donor gNB 200-1.

In Operation Example 1, in a case that the backhaul link of the IAB node 300-2 is not successfully re-established within the certain period of time, the MT of the IAB node 300-2 may transition to the RRC idle state. After transitioning to the RRC idle state, the MT of the IAB node 300-2 may establish an access link with the IAB node 300-1 in a case of receiving system information indicating that the IAB node 300-1 is available from the IAB node 300-1. Such system information is, for example, information included in type 1 of broadcast system information blocks (SIB1). Such system information is hereinafter referred to as "SIB Indication." The SIB Indication may be defined as information for access regulations. The SIB Indication may be information indicating that the network supports IAB function.

Figure 8:
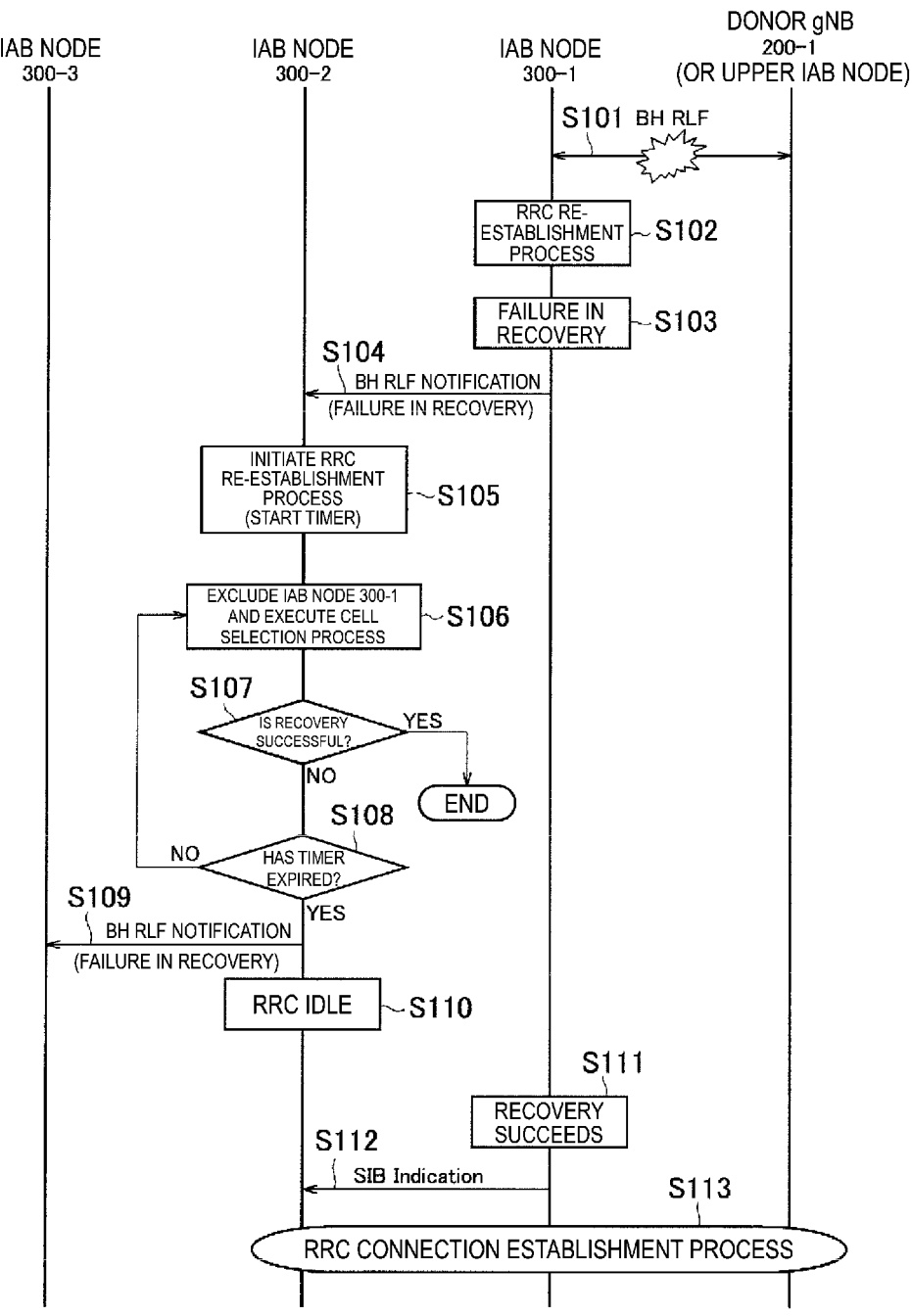
FIG. 8 is a diagram illustrating Operation Example 1 for solving Problem 1 according to an embodiment.

FIG. 8 is a diagram illustrating Operation Example 1 for solving Problem 1 described above.

As illustrated in FIG. 8, in step S101, the MT of the IAB node 300-1 detects a BH RLF with the donor gNB 200-1, corresponding to the upper apparatus of the IAB node 300-1. The upper apparatus of the IAB node 300-1 may be the upper IAB node 300 instead of the donor gNB 200-1.

In step S102, in a case of detecting the BH RLF, the MT of the IAB node 300-1 executes the RRC re-establishment process to re-establish the backhaul link. In this regard, it is assumed that the MT of the IAB node 300-1 fails in the RRC re-establishment process (i.e., fails to recover the backhaul link) (step S103).

Note that the DU of the IAB node 300-1 may periodically transmit, until step S103, the SIB Indication indicating that the IAB node 300-1 is available. The periodic transmission is not limited to transmission at a fixed period, and may be transmission at a variable period. The DU of the IAB node 300-1 aborts such transmission of SIB Indication after step S103. Although details will be described below, the UE 100-1 connected to the IAB node 300-1 executes process for re-establishing or releasing the access link of the UE 100-1 in a case of detecting abortion of transmission of the SIB Indication.

In step S104, the BAP entity of the IAB node 300-1 transmits the BH RLF notification message to the BAP entity of the IAB node 300-2. The BAP entity of the IAB node 300-2 notifies the MT of the IAB node 300-2 that the BH RLF notification message has been received from the IAB node 300-1.

In step S105, in a case of the notification that the BH RLF notification message has been received, the MT of the IAB node 300-2 initiates the RRC re-establishment process to re-establish the backhaul link of the IAB node 300-2. The MT of the IAB node 300-2 starts the timer T311 and initiates the cell selection process (step S106).

In step S106, the MT of the IAB node 300-2 performs, in the cell selection process, the exclusion process to exclude (the cell of) the IAB node 300-1 from the targets for which the backhaul link of the IAB node 300-2 is to be re-established.

In step S107, the MT of the IAB node 300-2 determines whether the appropriate cell has been detected by the cell selection process, and whether the RRC re-establishment process is successful (i.e., the recovery of the backhaul link is successful). In a case that the recovery of the backhaul link is successful (step S107: YES), the MT of the IAB node 300-2 stops the timer T311, and the flow is terminated.

In a case that the recovery of the backhaul link is not successful (step S107: NO), then in step S108, the MT of the IAB node 300-2 determines whether the timer T311 has expired. In a case that the timer T311 has not expired (step S108: NO), the process returns to step S106.

In a case that the timer T311 has expired (step S108: YES), then in step S109, the MT of the IAB node 300-2 notifies the BAP entity of the IAB node 300-2 of the expiry of the timer T311, and the BAP entity transmits the BH RLF notification message to the BAP entity of the IAB node 300-3.

Note that the DU of the IAB node 300-2 may periodically transmit, until step S109, the SIB Indication indicating that the IAB node 300-2 is available. The DU of the IAB node 300-2 aborts such transmission of SIB Indication after step S109. Although the details will be described below, the UE 100-2 connected to the IAB node 300-2 executes, in response to detection of abortion of transmission of the SIB Indication, process for re-establishing or releasing the access link of the IAB node 300-2.

In step S110, in a case of expiry of the timer T311, the MT of the IAB node 300-2 transitions from the RRC connected state to the RRC idle state, and performs the cell re-selection process. In the cell re-selection process, the MT of the IAB node 300-2 may select a cell that has transmitted the SIB Indication and that satisfies the predetermined radio quality criterion and that has better radio quality. Here, the MT of the IAB node 300-2 detects the SSB of the IAB node 300-1, but does not select the cell of the IAB node 300-1 because the IAB node 300-1 has aborted transmission of the SIB Indication. In a case of detecting a cell that has transmitted the SIB Indication and that satisfies the predetermined radio quality criterion, the MT of the IAB node 300-2 executes process for selecting the cell detected and establishing RRC connection. In this regard, the description is given below under assumption that such a cell has not been detected.

In step S111, the MT of the IAB node 300-1 succeeds in recovering the backhaul link with the upper apparatus (donor gNB 200-1). In a case of successful recovery of the backhaul link, the DU of the IAB node 300-1 resumes the periodic transmission of the SIB Indication (step S112).

In step S113, the MT of the IAB node 300-2 detects the cell of the IAB node 300-1 as a cell that has transmitted the SIB Indication and that satisfies the predetermined radio quality criterion, and performs process for selecting the cell detected and establishing the RRC connection.

(1.2) Operation Example 2

Now, Operation Example 2 for solving Problem 1 described above will be described. In Operation Example 2, the IAB node 300-2 that receives the BH RLF notification message from the IAB node 300-1 performs Conditional Handover (CHO) instead of the RRC re-establishment process. The conditional handover allows the backhaul link of the IAB node 300-2 to be switched from the IAB node 300-1 to another upper apparatus.

The conditional handover is that the MT of the IAB node 300-2 determines to perform the handover, unlike typical handovers that the CU determines to perform. Specifically, conditions for performing the handover are pre-configured for the RRC entity of the MT of the IAB node 300-2 by the RRC entity of the CU. The RRC entity of the MT of the IAB node 300-2 suspends the handover until the configured conditions are satisfied. The conditions include the condition that the BH RLF notification message is received from the upper apparatus.

In other words, in Operation Example 2, in a case of configuration, in the IAB node 300-2, of the conditional handover from the IAB node 300-1 to such another upper apparatus, the MT of the IAB node 300-2 suspends the handover to such another upper apparatus until the handover conditions for such another upper apparatus are satisfied. In response to receiving of the BH RLF notification message from the IAB node 300-1, the MT of the IAB node 300-2 performs the handover based on the configured conditional handover.

In the description below, the upper apparatus (another upper apparatus) corresponding to the handover destination of the conditional handover is assumed to be an IAB node 300-4. The IAB node 300-4 may be an IAB node 300 included in the IAB topology managed by the donor gNB 200-1. Alternatively, the upper apparatus (another upper apparatus) corresponding to the handover destination of the conditional handover may be the gNB 200 such as the donor gNB 200-1, instead of the IAB node 300.

Figure 9:
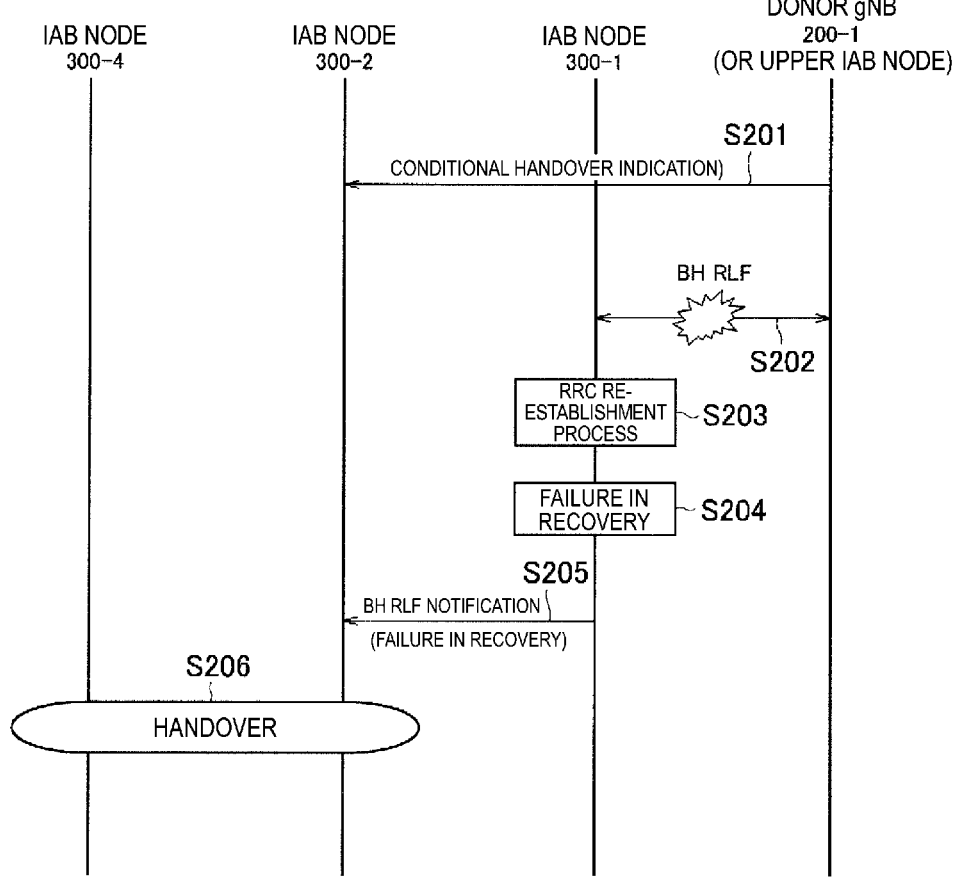
FIG. 9 is a diagram illustrating Operation Example 2 for solving Problem 1 according to an embodiment.

FIG. 9 is a diagram illustrating Operation Example 2 for solving Problem 1 described above.

As illustrated in FIG. 9, in step S201, the CU of the donor gNB 200-1 transmits a conditional handover indication for configuring the conditional handover, to the IAB node 300-2 via the IAB node 300-1.

In this regard, the CU of the donor gNB 200-1 transmits the conditional handover indication to each of the IAB nodes 300 under the control of the donor gNB 200-1 (in other words, the IAB nodes 300 belonging to the IAB topology managed by the donor gNB 200-1). The conditional handover indication may be an RRC message transmitted in a unicast manner, but may be an F1 message.

For example, when the IAB node 300 joins the IAB topology, the CU of the donor gNB 200-1 may transmit the conditional handover indication to this IAB node 300. After transmitting the conditional handover indication to the IAB node 300, the CU of the donor gNB 200-1 may transmit another conditional handover indication to the IAB node 300 to update the handover conditions.

The conditional handover indication includes a list of candidates for the handover destination (e.g., a list of cell identifiers) and condition information for configuring conditions for the handover. Separate condition information may be configured for each candidate in the list. For example, the condition information includes information indicating a first condition related to radio quality and information indicating a second condition for the BH RLF.

The first condition may include a threshold value for comparing the radio quality of the current serving cell and/or the radio quality of the cell of a candidate for the handover destination. The radio quality may be any measurement value indicating how favorable the radio state is, but may be, for example, Reference Signal Received Power (RSRP) and/or Reference Signal Received Quality (RSRQ).

The second condition includes the condition that the BH RLF notification message is received from the upper apparatus. In a case that the IAB node 300 has dual connectivity with two upper apparatuses, the second condition may include the condition that the BH RLF notification message is received from both of the two upper apparatuses. The second condition may include the condition that the IAB node 300 detects a BH RLF in the backhaul link of the IAB node 300 and fails to recover from the BH RLF.

The MT of the IAB node 300-2 receives the conditional handover indication from the donor gNB 200-1, and stores the list and condition information included in the conditional handover indication. The MT of the IAB node 300-2 starts determination process for determining whether the condition indicated by the stored condition information is satisfied.

In step S202, the MT of the IAB node 300-1 detects a BH RLF with the donor gNB 200-1, corresponding to the upper apparatus of the IAB node 300-1. The upper apparatus of the IAB node 300-1 may be the upper IAB node 300 instead of the donor gNB 200-1.

In step S203, in a case of detecting the BH RLF, the MT of the IAB node 300-1 executes the RRC re-establishment process to re-establish the backhaul link. In this regard, it is assumed that the MT of the IAB node 300-1 fails in the RRC re-establishment process (i.e., fails to recover the backhaul link) (step S204).

Note that the DU of the IAB node 300-1 may periodically transmit, until step S204, the SIB Indication indicating that the IAB node 300-1 is available. The DU of the IAB node 300-1 aborts such transmission of SIB Indication after step S204.

In step S205, the BAP entity of the IAB node 300-1 transmits the BH RLF notification message to the BAP entity of the IAB node 300-2. The BAP entity of the IAB node 300-2 notifies the MT of the IAB node 300-2 that the BH RLF notification message has been received from the IAB node 300-1.

In step S206, in response to the notification that the BH RLF notification message has been received, the MT of the IAB node 300-2 determines that the conditional handover conditions are satisfied, and performs a handover to the candidate cell corresponding to the conditions (the cell of the IAB node 300-4 in the example of FIG. 9).

(2) Operations for Solving Problem 2

Now, operations for solving Problem 2 described above will be described. The operations for solving Problem 2 can be implemented in combination with the operations for solving Problem 1 described above.

A communication control method according to an embodiment is a method of using the IAB node 300 connected to the upper apparatus via the backhaul link, and is executed by the IAB node 300 having failed to recover (re-establish) the backhaul link. Description is given below using the IAB node 300-1 illustrated in FIG. 7 as an example of the IAB node 300 having failed to recover the backhaul link. However, in a case that the IAB node 300-2 receiving the BH RLF notification message from the IAB node 300-1 fails to recover the backhaul link, the IAB node 300-2 may execute the present communication control method.

As illustrated in FIG. 7, in a case of failing to recover the backhaul link, the IAB node 300-1 executes first process for using a first message of the BAP layer of the IAB node 300-1 to cause re-establishment of the backhaul link of the lower IAB node 300-2 connected to the IAB node 300-1. In an embodiment, the first message is the BH RLF notification message described above, the first process includes process for transmitting the BH RLF notification message from the BAP layer of the IAB node 300-1. to the BAP layer of the IAB node 300-2.

In a case of failing to recover the backhaul link, the IAB node 300-1 executes second process for using a second message from a layer different from the BAP layer to cause re-establishment or releasing of the access link of the UE 100-1 connected to the IAB node 300-1. The UE 100-1 includes no BAP layer (BAP entity), and thus uses the second message from the layer different from the BAP layer to cause the access link of the UE 100-1 to be re-established or released, thus allowing the UE 100-1 to be transferred to a cell different from the cell of the IAB node 300-1.

Note that the second process is not limited to "re-establishment" of the access link but may involve "release" of the access link. This is because the UE 100 connects to no lower apparatus, leading to a low need to take into account maintenance of the IAB topology. On the other hand, the IAB node 300 connects to the lower apparatus, and thus in order to facilitate maintenance of the IAB topology, the first process involves "re-establishment" of the backhaul link.

In a case of succeeding in "re-establishment" of the access link, the UE 100 can maintain the RRC connected state. Similarly, in a case of succeeding in "re-establishment" of the backhaul link, the MT of the IAB node 300 can maintain the RRC connected state. On the other hand, in a case of "releasing" the access link, the UE 100 transitions to the RRC idle state. In a case of "releasing" the access link, the UE 100 may transition to the RRC inactive state.

(2.1) Operation Example 1

Now, Operation Example 1 for solving Problem 2 described above will be described. In Operation Example 1, the second process includes process for transmitting, to the UE 100-1, as the second message, system information including indication information causing the access link of the UE 100-1 to be re-established or released, or a MAC Control Element (CE) including the indication information.

In this regard, the indication information for causing the access link of the UE 100-1 to be established may be a request or notification for causing the UE 100-1 to execute the RRC re-establishment process. The indication information for causing the access link of the UE 100-1 to be released may be a request or notification for causing the UE 100-1 to execute the RRC release process.

The system information is a type of the RRC layer message, and is information to be broadcast. The DU of the IAB node 300 includes no RRC entity and thus fails to generate a dedicated RRC message corresponding to a unicast RRC message, but can generate a broadcast RRC message (i.e., system information). In particular, the DU of the IAB node 300 can generate SIB1 and transmit the SIB1 generated. Thus, the DU of the IAB node 300 can cause the access link of the UE 100-1 to be re-established or released by broadcasting the SIB1 including the indication information instead of the BH RLF notification message transmitted by the BAP entity. The indication information transmitted by the system information may be information for requesting RRC re-establishment process (RRC Reestablishment Required). The indication information transmitted by the system information may be information indicating that the backhaul link is being recovered (recovery in progress). The indication information transmitted by the system information may be information simply indicating that a BH RLF occurs.

The MAC CE is a type of a message of the MAC layer (Protocol Data Unit (PDU)) and is a unicast message. The DU of the IAB node 300 includes no RRC entity and thus fails to generate a dedicated RRC message, but can generate a MAC CE. Thus, the DU of the IAB node 300 can cause the access link of the UE 100-1 to be re-established or released by transmitting the MAC CE including the indication information instead of the BH RLF notification message transmitted by the BAP entity.

Figure 10:
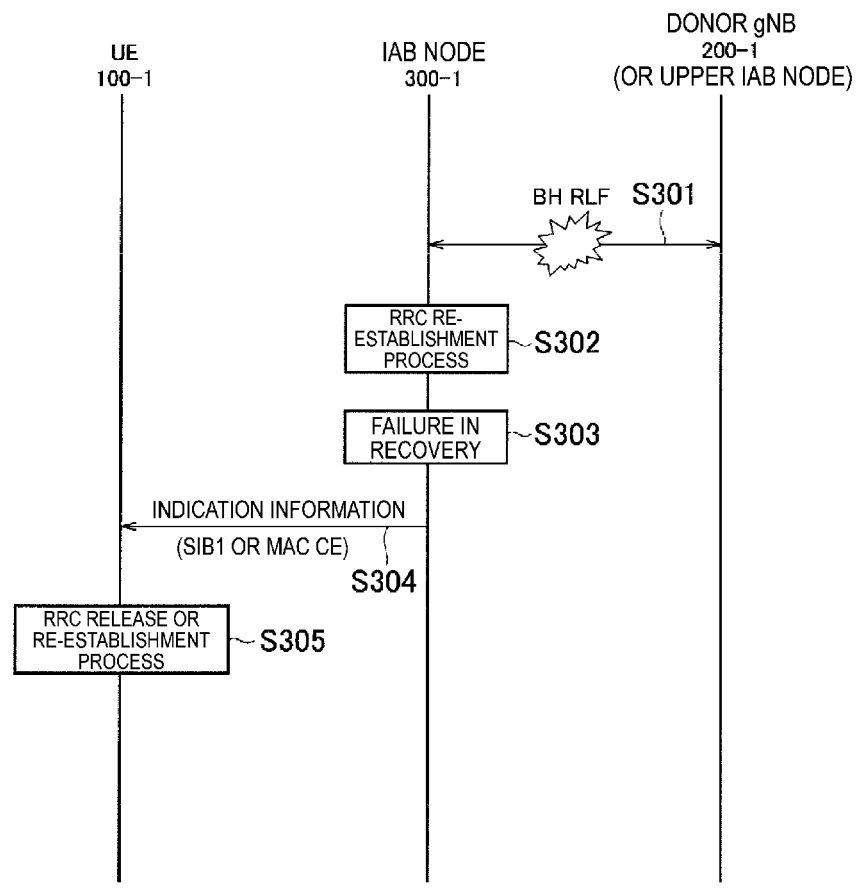
FIG. 10 is a diagram illustrating Operation Example 1 for solving Problem 2 according to an embodiment.

FIG. 10 is a diagram illustrating Operation Example 1 for solving Problem 2 described above.

As illustrated in FIG. 10, in step S301, the MT of the IAB node 300-1 detects a BH RLF with the donor gNB 200-1, corresponding to the upper apparatus of the IAB node 300-1. The upper apparatus of the IAB node 300-1 may be the upper IAB node 300 instead of the donor gNB 200-1.

In step S302, in response to detection of the BH RLF, the MT of the IAB node 300-1 executes the RRC re-establishment process to re-establish the backhaul link. In this regard, it is assumed that the MT of the IAB node 300-1 fails in the RRC re-establishment process (i.e., fails to recover the backhaul link) (step S303).

Note that the DU of the IAB node 300-1 may periodically transmit, until step S303, the SIB Indication indicating that the IAB node 300-1 is available. The DU of the IAB node 300-1 aborts such transmission of SIB Indication after step S303. However, after the recovery of the backhaul link fails, delay occurs until the transmission of the SIB Indication is aborted.

In step S304, the DU of the IAB node 300-1 transmits, to the UE 100-1, the system information (SIB1) including the indication information to cause the access link of the UE 100-1 to be re-established or released, or the MAC CE including the indication information. The UE 100 receives the indication information. Note that the DU of the IAB node 300-1 continues to transmit SSBs and the like without interrupting the cell.

In step S305, in a case of receiving the indication information, the UE 100 executes the RRC re-establishment process or the RRC release process. In a case that the UE

100 executes the RRC re-establishment process, the UE 100 may perform the exclusion process described above (see FIG. 8) in the cell selection process in the RRC connected state. In a case that the UE 100 executes the RRC release process, the UE 100 may perform similar exclusion process in the cell re-selection process in the RRC idle state or the RRC inactive state.

In a case of detecting a BH RLF in step S301, the DU of the IAB node 300-1 may transmit, to the UE 100-1, above-described system information (SIB1) including information indicating that the BH RLF occurs, or the MAC CE including this information. In a case of receiving this information once, the UE 100 may immediately execute the RRC re-establishment process or the RRC release process. In a case of receiving the information indicating that the BH RLF occurs, the UE 100 may start the timer, and in a case of receiving the information periodically transmitted even after a predetermined period of time configured for the timer expires, the UE may execute the RRC re-establishment process or the RRC release process.

While attempting to execute the RRC re-establishment process in step S302, the DU of the IAB node 300-1 may transmit, to the UE 100-1, the above-described system information (SIB1) including the information (recovery in progress) indicating that the backhaul link is being recovered, or the MAC CE including this information. In a case of receiving this information once, the UE 100 may immediately execute the RRC re-establishment process or the RRC release process. In a case of receiving the information (recovery in progress) indicating that the backhaul link is being recovered, the UE 100 may start the timer, and in a case of receiving the recovery in progress periodically transmitted even after a predetermined period of time configured for the timer expires, the UE 100 may execute the RRC re-establishment process or the RRC release process.

Now, operations in a case where the UE 100 executes the RRC re-establishment process will be described. Note that the operations can also be applied in Operation Examples 2 and 3 described below.

First, in response to receiving of the indication information, the UE 100 initiates the RRC re-establishment process to re-establish the access link, starts the timer T311, and initiates the cell selection process. In this regard, in the cell selection process, the UE 100 performs the exclusion process to exclude (the cell of) the IAB node 300-1 from the targets for which the access link of the UE 100 is to be re-established.

Second, in a case of detecting the appropriate cell by the cell selection process and succeeding in the RRC re-establishment process (that is, succeeding in the recovery of the access link), the UE 100 stops the timer T311 and terminates the process.

Third, in a case of the expiry of the timer T311 without successful recovery of the access link, the UE 100 transitions from the RRC connected state to the RRC idle state, and executes the cell re-selection process. In the cell re-selection process, the UE 100 may select a cell that satisfies the predetermined radio quality criterion and that has better radio quality.

(2.2) Operation Example 2

Now, Operation Example 2 for solving Problem 2 described above will be described. As described above, in a case that no BH RLF occurs in the backhaul link of the IAB node 300-1, the IAB node 300-1 periodically transmits, as the second message, system information (SIB Indication)

indicating that the IAB node 300-1 is available. In Operation Example 2, the second process includes process for aborting transmission of the SIB Indication.

In a case of detecting abortion of transmission of the SIB Indication from the IAB node 300-1, the UE 100-1 connected to the IAB node 300-1 executes process for re-establishing or releasing the access link of the IAB node 300-1. In other words, in a case of detecting abortion of transmission of the SIB Indication for IAB access grant, the UE 100-1 considers that RRC release or RRC re-establishment is indicated.

As described above, the system information is a type of the RRC layer message, and is information to be broadcast. The DU of the IAB node 300 includes no RRC entity and thus fails to generate a dedicated RRC message corresponding to a unicast RRC message, but can generate a broadcast RRC message (i.e., system information). Thus, the DU of the IAB node 300 can re-establish or release the access link of the UE 100-1 by aborting the periodic transmission of the SIB Indication.

Figure 11:
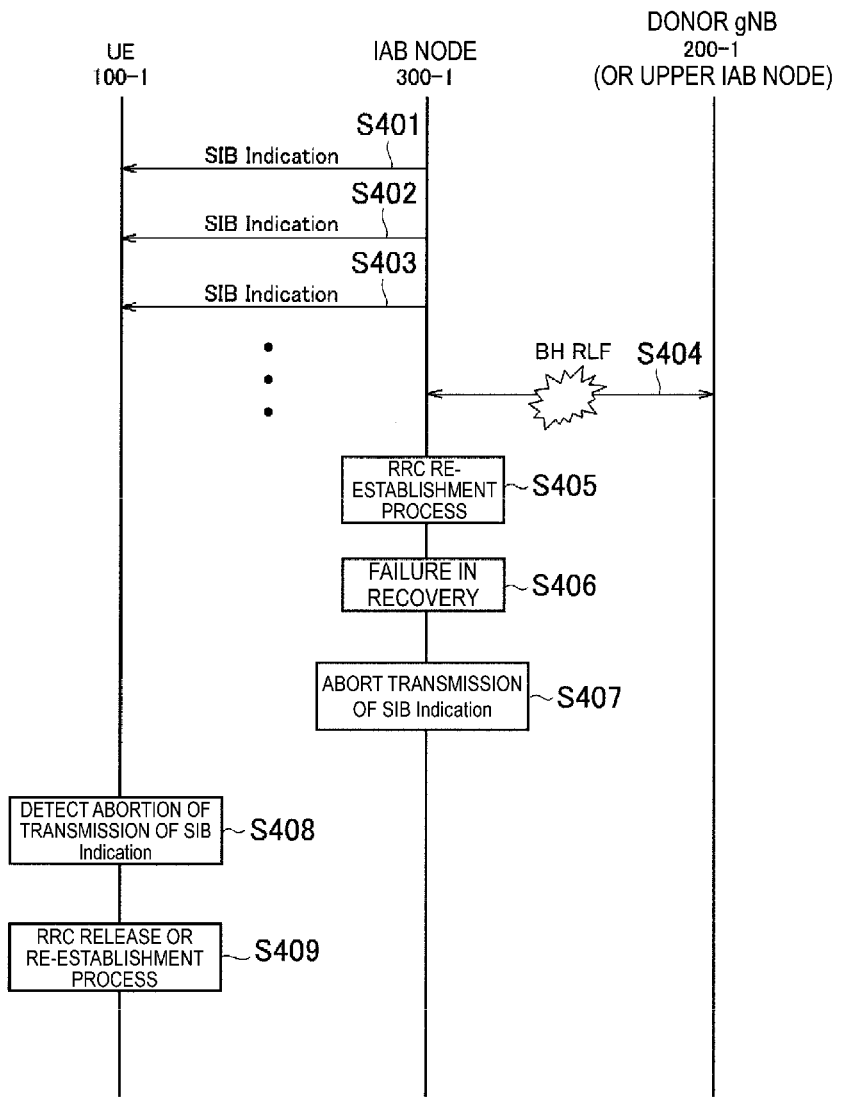
FIG. 11 is a diagram illustrating Operation Example 2 for solving Problem 2 according to an embodiment.

FIG. 11 is a diagram illustrating Operation Example 2 for solving Problem 2 described above.

As illustrated in FIG. 11, in steps S401 to S403, the DU of the IAB node 300-1 periodically transmits the SIB Indication. The SIB Indication may be information included in the SIB 1. Note that the DU of the IAB node 300-1 continues the periodic transmission of the SIB Indication until step S407 described below. The UE 100-1 monitors the SIB Indication from the IAB node 300-1 and considers that the IAB node 300-1 is available while the SIB Indication is detected.

In step S404, the MT of the IAB node 300-1 detects a BH RLF with the donor gNB 200-1, corresponding to the upper apparatus of the IAB node 300-1. The upper apparatus of the IAB node 300-1 may be the upper IAB node 300 instead of the donor gNB 200-1.

In step S405, in a case of detecting the BH RLF, the MT of the IAB node 300-1 executes the RRC re-establishment process to re-establish the backhaul link. In this regard, it is assumed that the MT of the IAB node 300-1 fails in the RRC re-establishment process (i.e., fails to recover the backhaul link) (step S406).

In step S407, in response to failure of recovery of the backhaul link, the DU of the IAB node 300-1 aborts transmission of the SIB Indication. However, the DU of the IAB node 300-1 continues to transmit SSBs and the like without interrupting the cell.

In step S408, the UE 100-1 detects abortion of transmission of the SIB Indication from the IAB node 300-1. For example, in a case that the UE 100-1 starts the timer in a case of receiving the SIB Indication from the IAB node 300-1 and fails to receive the next SIB Indication before the timer expires, the UE 100-1 determines that the transmission of the SIB Indication from the IAB node 300-1 is aborted.

In step S409, in response to detecting of abortion of transmission of the SIB Indication from the IAB node 300-1, the UE 100-1 executes the RRC re-establishment process or the RRC release process. In a case that the UE 100 executes the RRC re-establishment process, the UE 100 may perform the exclusion process described above (see FIG. 8) in the cell selection process in the RRC connected state. In a case that the UE 100 executes the RRC release process, the UE 100 may perform similar exclusion process in the cell re-selection process in the RRC idle state or the RRC inactive state.

(2.3) Operation Example 3

Now, Operation Example 3 for solving Problem 2 described above will be described. In Operation Example 3, before a failure occurs in the backhaul link of the IAB node 300-1, the IAB node 300-1 receives, from the donor gNB 200-1, a second message for releasing or re-establishing the access link of the UE 100-1, and holds the second message received. In the description below, the second message is an RRC message (dedicated RRC message) transmitted in a unicast manner, but the second message may be the conditional handover indication described above.

In Operation Example 3, the second process includes process for transmitting the dedicated RRC message held to the UE 100-1. Specifically, in response to failure of recovery from the backhaul link failure of the IAB node 300-1, the IAB node 300-1 transmits, to the UE 100-1, the dedicated RRC message held by the IAB node 300-1. This allows the access link of UE 100-1 to be re-established or released.

The dedicated RRC message may be an RRC Release message. In this case, in response to receiving of the RRC release message from the IAB node 300-1, the UE 100-1 transitions to the RRC idle state or the RRC inactive state.

The dedicated RRC message may be an RRC Re-establishment Required message. In this case, in a case of reception of the RRC Re-establishment Required message from the IAB node 300-1, the UE 100-1 executes the RRC re-establishment process while remaining in the RRC connected state.

Figure 12:
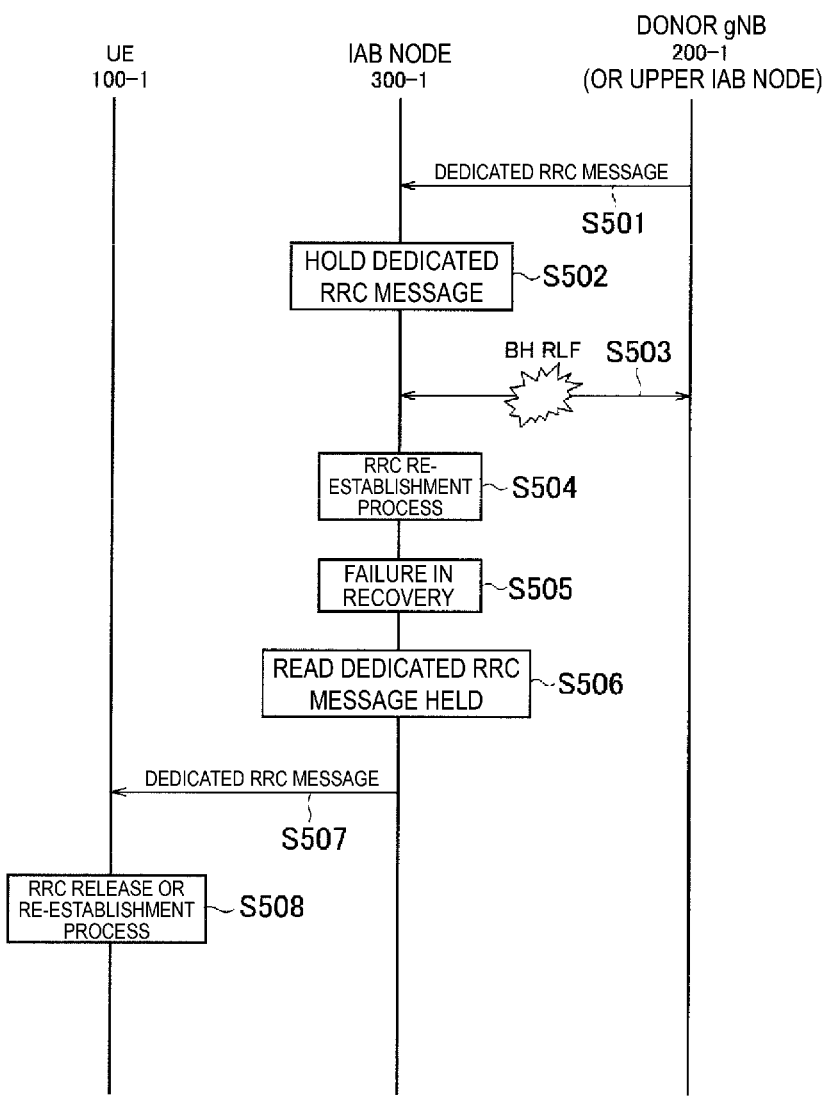
FIG. 12 is a diagram illustrating Operation Example 3 for solving Problem 2 according to an embodiment.

FIG. 12 is a diagram illustrating Operation Example 3 for solving Problem 2 described above.

As illustrated in FIG. 12, in step S501, the CU of the donor gNB 200-1 transmits the dedicated RRC message to the MT of the IAB node 300-1. Between the donor gNB 200-1 and the IAB node 300-1, another IAB node 300 may be interposed.

In a case that a plurality of UEs 100-1 are connected to the IAB node 300-1, the CU of the donor gNB 200-1 may individually generate and transmit the dedicated RRC message for each of the plurality of UEs 100-1. After transmitting, to the IAB node 300-1, the dedicated RRC message corresponding to one of the UEs 100-1, the CU of the donor gNB 200-1 may transmit, to the IAB node 300-1, another dedicated RRC message corresponding to the one of the UEs 100-1 to update the content of the dedicated RRC message.

In step S502, the MT of the IAB node 300-1 holds the dedicated RRC message received from the CU of the donor gNB 200-1. The entity holding the dedicated RRC message is not limited to the MT, and may be the DU or the BAP entity.

In step S503, the MT of the IAB node 300-1 detects a BH RLF with the donor gNB 200-1, corresponding to the upper apparatus of the IAB node 300-1. The upper apparatus of the IAB node 300-1 may be the upper IAB node 300 instead of the donor gNB 200-1.

In step S504, in a case of detecting the BH RLF, the MT of the IAB node 300-1 performs the RRC re-establishment process to re-establish the backhaul link. In this regard, it is assumed that the MT of the IAB node 300-1 fails in the RRC re-establishment process (i.e., fails to recover the backhaul link) (step S505).

In step S506, in a case of a failure in the recovery of the backhaul link, the DU of the IAB node 300-1 reads out a dedicated RRC message held in step S502, and transmits the dedicated RRC message read to the UE 100-1 (step S507). Note that the DU of the IAB node 300-1 continues to transmit SSBs and the like without interrupting the cell.

In step S508, in a case of receiving the dedicated RRC message from the IAB node 300-1, the UE 100-1 executes the RRC re-establishment process or the RRC release process. In a case that the UE 100 executes the RRC reestablishment process, the UE 100 may perform the exclusion process described above (see FIG. 8) in the cell selection process in the RRC connected state. In a case that the UE 100 executes the RRC release process, the UE 100 may perform similar exclusion process in the cell re-selection process in the RRC idle state or the RRC inactive state.

Other Embodiments

In the above-described embodiments, the following procedure may be applied as a procedure for access to the target cell in the RRC re-establishment process.

First, in the RRC Re-establishment process, the MT transmits an RRC Re-establishment Request message to a selected cell. In the message, the MT may notify information indicating an RRC re-establishment request from the MT as an IAB node.

The information indicating the RRC re-establishment request as an IAB node may be notified as a Cause Value for the RRC re-establishment process, or may be notified by a new information element (IE).

The information indicating the RRC re-establishment request as an IAB node may be notified exclusively in a case that the IAB node (MT) includes a lower connection (connection to a slave IAB node or the UE). The information may further include information indicating whether the lower connection involves high-priority communication.

Second, the cell (upper apparatus) that receives the RRC Re-establishment Request message including the information identifying the RRC re-establishment request as an IAB node, the cell (upper apparatus) can make an appropriate response based on the information. For example, the cell transmits any one of the RRC Reestablishment message, an RRC Setup message, an RRC Reject message, and an RRC Release message to the IAB node (MT).

The information identifying the RRC re-establishment request as an IAB node may be notified by, instead of the RRC Re-establishment Request message, an RRC Re-establishment Complete message that is a response message for the RRC Re-establishment message. In this case, the cell can appropriately execute next process. For example, the cell transmits one of the RRC Reconfiguration message and the RRC Release message to the UE.

In the embodiments described above, an example has been mainly described, in which the mobile communication system 1 is a 5G mobile communication system. However, the base station in the mobile communication system 1 may be an eNB used as an LTE base station. The core network in the mobile communication system 1 may be an Evolved Packet Core (EPC). Furthermore, the gNB can also be connected to the EPC, the eNB can also be connected to the 5GC, and the gNB and the eNB can also be connected via an inter-base station interface (Xn interface, X2 interface).

A program that causes a computer to execute each of the processing operations according to the embodiments described above may be provided. The program may be recorded in a computer-readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like. A chip set may be provided that includes a memory that stores a program for executing each of the processing operations performed by the UE 100, the gNB 200, or the IAB node 300 and a processor that executes the program stored in the memory.

Supplementary Note

1. Introduction

A work item related to Integrated Access and Backhaul (IAB) was approved in RAN #82. In RAN2 #107 bis, the recovery from and the notification of a failure in the backhaul radio link (BH RLF) have been discussed in detail, and the following agreement has been reached.

R2 confirms that in a case that the IAB node is not configured with DC, process using the same mechanism and procedure as those of the RLF process of UE (including detection, recovery, and the like) currently prescribed in TS 38.331 is applied to the BH RLF. In a case that additional functional expansion is needed, further studies are necessary.

In a case that NR DC is configured for the IAB node, the RLF in 2.1 is detected separately in the MCG link and in the SCG link, and the existing UE procedure in 2.2 is used for failure process of the MCG link and the SCG link.

For the recovery from the BH RLF in the case of DC, reutilization of the MCG and SCG failure recovery procedure of UE is agreed as a work assumption, the reutilization being prescribed in Rel-16.

For the IAB node not configured with DC, RRC re-establishment is initiated in a case of reception of the downstream notification "failure in recovery."

In the case of DC, in a case of receiving the notification "failure in recovery" from the master node of the MCG link or/and the SCG link, the IAB node considers that a failure has occurred in the radio link, and uses the existing RRC or Rel-16 mechanism (e.g., MCG or SCG failure report, RRC re-establishment).

R2 assumes that in a case of a failure in RRC re-establishment, the RLF notification "failure in recovery" is triggered. However, whether this needs to be prescribed needs to be further studied.

The BAP layer is used to transmit the BH RLF notification.

R2 assumes the support of upstream BH RLF notification to the donor CU via the current F1-AP signaling.

The supplementary note discusses problems with the BH RLF process particularly in terms of MT and UE operations.

2. Discussion

2.1. Operations of MT at Time of Failure in BH RLF Recovery of Master

RAN2 #107 bis discussed what the BH RLF notification indicates and agreed that the BH RLF notification indicates the "failure in recovery" of the master IAB node. However, some companies point out that this is very similar to simply turning off the cell.

Ericsson considers that this need not be indicated but that the cell may be simply turned off. Kyocera agrees and considers that turning off the cell is easier. QC considers that the difference lies in that this operation is performed by a downstream node.

Huawei considers that this has already been agreed on.

ZTE considers that indication of occurrence of an RLF is more useful than indication of a failure in recovery in allowing the downstream node to start preparing for the recovery. Intel agrees. LG considers both indications are useful. Ericsson also considers that more notification is required.

Huawei considers that the operation of the MT in the indication should be focused on. Huawei considers that this mechanism needs to operate at high speed.

Samsung considers that the failure in recovery is most important.

NEC considers that turning off the cell is not a good idea because the backhaul of the cell may be recovered.

According to our understanding, based on the above discussions, the cell continues to transmit SSBs even after transmitting the BH RLF notification to the downstream node.

Observation 1: Common understanding may be that the cell continues to transmit SSBs even after the BH RLF notification is transmitted due to a failure in BH RLF recovery.

On the other hand, RAN2 has agreed that in a case of reception of the BH RLF notification, in other words, "failure in recovery" at a slave IAB node, the existing recovery procedure is reutilized, specifically:

for the MT not configured with DC, RRC re-establishment is initiated;

for the notification from the MT and the SCG configured with DC, SCG failure recovery is initiated;

for the notification from the MT and the MCG configured with DC, MCG failure recovery is initiated; and for the notification from the MT and both MCG/SCG configured with DC, RRC re-establishment is initiated.

Figure 13:
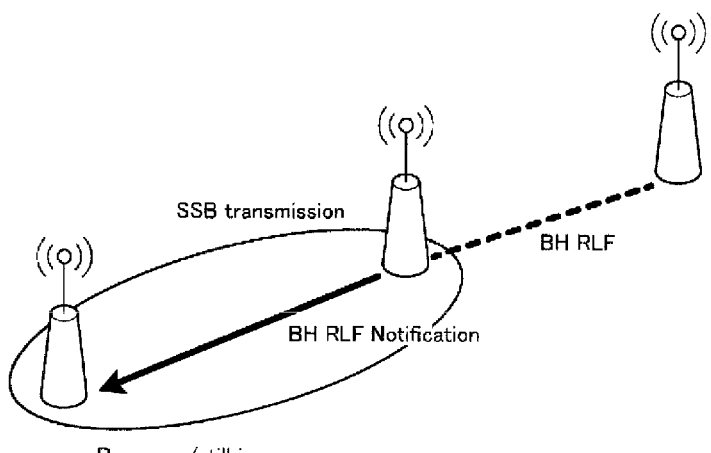
FIG. 13 is a diagram related to a supplementary note.

FIG. 13 is a diagram illustrating the recovery using the BH RLF notification while the MT is still within the coverage.

2.1.1. Cell Selection after Reception of BH RLF

The RRC re-establishment procedure includes the cell selection process, and thus in a case that an appropriate cell is found, the MT re-selects the cell. In terms of Observation 1, the MT in the cell selection during RRC re-establishment may again select the cell transmitting the BH RLF notification because the cell is still transmitting SSBs. For example, even a slave located in the center of the cell may receive the BH RLF notification from the master. In other words, even in a case that the link between the slave and the master is still favorable, the RLF recovery of the link between the master and a master of the master may have failed. Furthermore, the need for the master to be constantly the best cell through appropriate deployment, particularly, Rel-16 supporting only fixed IAB nodes is further unfavorable. Only the radio state with a bad access link is taken into account, and thus the RRC re-establishment for RLF is out of the original assumption.

Observation 2: After reception of the BH RLF notification, the cell is still transmitting SSBs, and thus the MT may select the same cell again.

Of course, the operation in Observation 2 is introduced for quick adaptation to the topology and is not intended. In other words, the MT should move to a cell that has not transmitted the BH RLF notification. Accordingly, RAN2 should discuss solutions for avoiding such erroneous cell selection. A simple method is, for example, to exclude the cells to which the MT has transmitted the BH RLF notification, from the candidates for cell selection, for example, for up to 300 seconds or by using a timer configured by the gNB.

Proposal 1: RAN2 should agree that the cells to which the MT has transmitted the BH RLF notification may be excluded from the candidates for cell (re)selection for a particular period of time.

2.1.2. Conditional Handover in Case of Reception of BH RLF Notification

In section 9.7.15 of TR 38.874, RAN2 has confirmed that for efficient BH RLF recovery, "an alternative backhaul link and an alternative route are prepared in advance (i.e., before an RLF occurs)." This type of initiative approach is useful in a case that the backhaul link is suddenly degraded, particularly in the case of a millimeter-wave backhaul. In this case, the BH RLF, i.e., the failure in the communication between the CU and the DU precludes transfer of the dedicated RRC message including "RRC Reconfiguration by Synchronization," thus preventing the known handover from functioning.

It may be conceivable to utilize conditional handover (CHO) that is discussed for Rel-16 NR mobility expansion WI and that is still useful for initiative BH RLF recovery conditional handover (CHO). The CHO is performed in a case that conditions for a measurement report event are satisfied (i.e., the case is the same as the case where the backhaul link is degraded), and thus the CHO can be directly reused for the recovery of the backhaul link of slave.

Observation 3: The conditional handover may be configured for the IAB node for initiative BH RLF recovery.

On the other hand, additional discussion may be required for how the CHO functions when the BH RLF notification is received, that is, when in spite of a failure in the recovery of the backhaul of the master, the backhaul of the subject node is still favorable. For example, in a case other than DC, in response to reception of the BH RLF notification, the MT initiates the RRC re-establishment as agreed. However, in a case that the MT is configured with the CHO, the CHO is desirably performed to allow the MT to access the prepared cell and the appropriate IAB node belonging to the same CU. This optimization is very simple but effective because the handover in related art does not function for the same reason as described above, that is, due to a failure in the backhaul link between the CU and the DU. Consequently, RAN2 should agree with addition of one criterion for CHO execution. In other words, RAN2 should agree with addition of the case of reception of the BH RLF notification.

Proposal 2: RAN2 should agree that the MT performs the conditional handover in response to receiving of the BH RLF notification from the master (in a case that such reception is configured).

2.2. Operations of UE at Time of Failure in BH RLF Recovery of Master

As illustrated in the architecture including the architecture 1*a* of TR, the UE includes no BAP layer. This principle is particularly important for Rel-15 UE. In other words, IAB networking is transparent to UE regardless of the release of the specifications.

On the other hand, RAN2 has agreed that "the BH RLF notification is transmitted by using the BAP layer." This means that even in a case of the Rel-16 UE, the UE fails to receive the BH RLF notification. Furthermore, as described in Observation 1, the cell may continue to transmit SSBs even after the BH RLF recovery fails. The UE needs to wait for ultimate turn-off of the cell before RRC re-establishment, and fails to receive service for a certain period of time. This may degrade user experience.

Observation 4: The UE fails to receive the BH RLF notification transmitted via the BAP layer.

Observation 5: In a case that the serving cell continues the SSB transmission in spite of a failure in the recovery of the serving cell from the BH RLF, the UE needs to wait for a long period of time before RRC re-establishment in some cases.

Figure 14:
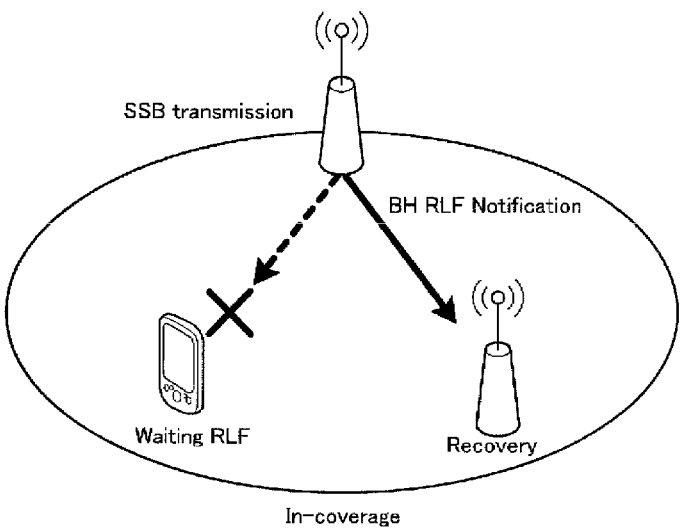
FIG. 14 is a diagram related to the supplementary note.

FIG. 14 is a diagram illustrating the UE failing to receive the BH RLF notification via the BAP.

In particular, with the use case of URLLC in Rel-16 taken into account, the IAB networking may be inappropriate for IIoT deployment and the like unless the UE is allowed to perform operations at high speed for the BH RLF in the serving cell. Consequently, it is important to support a method for high-speed reconnection to cells for which at least the Rel-16 UE is appropriate.

Proposal 3: RAN2 should discuss methods for allowing the UE to quickly avoid the current serving cell that has failed in the BH RLF recovery in the case of at least the Rel-16 UE (that supports, for example, an industrial use case).

In a case that Proposal 3 can be agreed with, in terms of the discussion in RAN2, the SIB1 may broadcast any indication for notifying the Rel-16 UE of a failure in the BH RLF recovery to initiate RRC re-establishment in the case of non-DC or to recover from an MCG/SCG failure in the case of DC. This indication may be any alternative use of, for example, the BH RLF notification (i.e., "failure in recovery" in addition to BAP Control PDU), another type of the BH RLF notification (e.g., "recovery in progress"), a simple trigger for notifying the UE that RRC re-establishment/ release is to be performed, and/or an indication of initial access (e.g., "IAB support indication" or integrated access control). For the details, further studies are currently required.

Proposal 4: RAN2 should agree that an indication broadcast by the SIB1 notifies a failure in the BH RLF recovery, allowing the UE to initiate RRC re-establishment, MCG failure recovery, and/or SCG failure recovery. For the details of the indication, further studies are required.

The invention claimed is:

1. A communication control method executed in a wireless relay apparatus connected to an upper apparatus via a backhaul link, the communication control method comprising:

when the wireless relay apparatus joins a topology formed by at least one other wireless relay apparatus connected to a donor apparatus via at least one hop, receiving, from the donor apparatus, information for configuring a conditional handover to be executed in response to fulfillment of a condition, the information including a list of candidate cells;

receiving, from the upper apparatus, a failure notification transmitted in a case that a failure occurs in a backhaul link of the upper apparatus and that the upper apparatus fails to recover the backhaul link;

after receiving the failure notification, determining if the condition is met;

in a state in which the conditional handover is configured for the wireless relay apparatus, after receiving the failure notification from the upper apparatus and in response to determining that the condition is met, executing the conditional handover from the upper apparatus to a candidate cell included in the information received from the donor apparatus; and performing re-establishment of the backhaul link with the upper apparatus if the condition is not met and the conditional handover is not executed.

2. A wireless relay apparatus connected to an upper apparatus via a backhaul link, the wireless relay apparatus comprising:

a receiver configured to, when the wireless relay apparatus joins a topology formed by at least one other wireless relay apparatus connected to a donor apparatus via at least one hop, receive from the donor apparatus, information for configuring a conditional handover to be executed in response to fulfillment of a condition, the information including a list of candidate cells;

the receiver configured to receive, from the upper apparatus, a failure notification transmitted in a case that a failure occurs in a backhaul link of the upper apparatus and that the upper apparatus fails to recover the backhaul link;

a controller configured to determine if the condition is met after the receiver receiving the failure notification, the controller configured to, in a state in which the conditional handover is configured for the wireless relay apparatus, after receiving the failure notification from the upper apparatus and in response to determining that the condition is met, execute the conditional handover from the upper apparatus to a candidate cell included in the information received from the donor apparatus; and wherein re-establishment of the backhaul link with the upper apparatus is performed if the condition is not met and the conditional handover is not executed.

3. An apparatus for controlling a wireless relay apparatus connected to an upper apparatus via a backhaul link, the apparatus comprising a processor and a memory, the processor configured to when the wireless relay apparatus joins a topology formed by at least one other wireless relay apparatus connected to a donor apparatus via at least one hop, receive, from the donor apparatus, information for configuring a conditional handover to be executed in response to fulfillment of a condition, the information including a list of candidate cells, receive, from the upper apparatus, a failure notification transmitted in a case that a failure occurs in a backhaul link of the upper apparatus and that the upper apparatus fails to recover the backhaul link, after receiving the failure notification, determine if the condition is met, and in a state in which the conditional handover is configured for the wireless relay apparatus, after receiving the failure notification from the upper apparatus and in response to determining that the condition is met, execute the conditional handover from the upper apparatus to a candidate cell included in the information received from the donor apparatus, wherein re-establishment of the backhaul link with the upper apparatus is performed if the condition is not met and the conditional handover is not executed.

4. A non-transitory computer-readable medium comprising, stored thereupon, computer program instructions for execution by a wireless relay apparatus connected to an upper apparatus via a backhaul link, the program instructions being configured to cause the wireless relay apparatus to execute processing of:

when the wireless relay apparatus joins a topology formed by at least one other wireless relay apparatus connected to a donor apparatus via at least one hop, receiving, from the donor apparatus, information for configuring a conditional handover to be executed in response to fulfillment of a condition, the information including a list of candidate cells;

receiving, from the upper apparatus, a failure notification transmitted in a case that a failure occurs in a backhaul link of the upper apparatus and that the upper apparatus fails to recover the backhaul link;

after receiving the failure notification, determining if the condition is met;

in a state in which the conditional handover is configured for the wireless relay apparatus, after receiving the failure notification from the upper apparatus and in response to determining that the condition is met, executing the conditional handover from the upper apparatus to a candidate cell included in the information received from the donor apparatus; and performing re-establishment of the backhaul link with the upper apparatus if the condition is not met and the conditional handover is not executed.

5. A system comprising:

a wireless relay apparatus connected to an upper apparatus via a backhaul link, wherein the wireless relay apparatus is configured to:

when the wireless relay apparatus joins a topology formed by at least one other wireless relay apparatus connected to a donor apparatus via at least one hop, receive, from the donor apparatus, information for configuring a conditional handover to be executed in response to fulfillment of a condition, the information including a list of candidate cells;

receive, from the upper apparatus, a failure notification transmitted in a case that a failure occurs in a backhaul link of the upper apparatus and that the upper apparatus fails to recover the backhaul link;

after receiving the failure notification, determine if the condition is met; and in a state in which the conditional handover is configured for the wireless relay apparatus, after receiving the failure notification from the upper apparatus and in response to determining that the condition is met, execute the conditional handover from the upper apparatus to a candidate cell included in the information received from the donor apparatus, wherein re-establishment of the backhaul link with the upper apparatus is performed if the condition is not met and the conditional handover is not executed.

* * * * *